(12) United States Patent
Castillo

(10) Patent No.: US 7,506,680 B1
(45) Date of Patent: Mar. 24, 2009

(54) HELICAL HEAT EXCHANGE APPARATUS

(76) Inventor: Gil Del Castillo, 21550 Provincial Blvd. #1622, Katy, TX (US) 77450

( * ) Notice: Subject to any disclaimer, the term of this patent is extended or adjusted under 35 U.S.C. 154(b) by 750 days.

(21) Appl. No.: 11/133,886

(22) Filed: May 23, 2005

(51) Int. Cl.
*F28F 13/12* (2006.01)
*F28D 7/10* (2006.01)

(52) U.S. Cl. ............... 165/41; 165/109.1; 165/155; 165/156; 123/41.49

(58) Field of Classification Search ........... 165/122, 165/156, 41, 109.1, 155; 123/41.49
See application file for complete search history.

(56) References Cited

U.S. PATENT DOCUMENTS

| | | | |
|---|---|---|---|
| 4,062,401 A | 12/1977 | Rudny et al. | |
| 4,066,047 A | 1/1978 | Vidakovic et al. | |
| 4,136,735 A | 1/1979 | Beck et al. | |
| 4,306,614 A | 12/1981 | Maggiorana | |
| 4,556,103 A * | 12/1985 | Kuwa et al. | 165/122 |
| 4,690,210 A | 9/1987 | Niggemann et al. | |
| 4,895,203 A | 1/1990 | McLaren | |
| 5,287,917 A | 2/1994 | Cannata | |
| 5,343,936 A | 9/1994 | Beatenbough et al. | |
| 5,445,218 A | 8/1995 | Nieh | |
| 6,330,910 B1 | 12/2001 | Bennett | |
| 2005/0133202 A1 * | 6/2005 | Jorgensen et al. | 165/156 |

* cited by examiner

*Primary Examiner*—Leonard R Leo
(74) *Attorney, Agent, or Firm*—Egbert Law Offices PLLC

(57) ABSTRACT

A heat exchange apparatus has a housing, a first fan cooperative with the housing for drawing air through the housing, an air flow line extending within the housing, a second fan connected to the air flow line for drawing air along the air flow line, and a coolant tube extending in a helical pattern around in the air flow line. A conduit extends over and around the coolant tube and the air flow line. The second fan passes air in heat exchange relationship to the coolant tube interior of the conduit. The housing can be placed forwardly of an engine of a vehicle.

18 Claims, 3 Drawing Sheets

HELICAL HEAT EXCHANGE APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to heat exchange apparatus. More particularly, the present invention relates to radiators as used in the engine compartment of a vehicle. More particularly, the present invention relates to heat exchange apparatus in which a coolant line is arranged in a helical pattern within a conduit for heat exchange with air passing through the conduit.

BACKGROUND OF THE INVENTION

Most vehicles generally in use today, such as passenger cars and motor trucks, are propelled by internal combustion engines and such engines, as is well known, generate heat during the operation thereof. For the most part, the motor vehicle internal combustion engines employed are of the liquid-cooled type which entail the circulation, under pressure, of a coolant through the engine for absorbing heat. The correct operating temperature of the engine is maintained by subsequently and sequentially passing, under pressure, the heated coolant received from the engine through a heat exchange system or apparatus for dissipating heat from the coolant to the atmosphere and returning the coolant to the engine for recirculation therein. Generally, the heat exchange apparatus employed includes a heat exchanger or radiator through which the heated coolant received from the engine is caused to flow. Simultaneously, cooling air is also caused to flow through the radiator which absorbs heat from the heated coolant and carries it out into the atmosphere.

The cooling capacity of a heat exchange apparatus is dependent upon many factors including the velocity and volume of the air caused to flow through radiator core as well as the distribution pattern of the air stream over the available heat exchange surface of the radiator core. Ideally, to achieve the highest heat transfer efficiency of any heat exchange apparatus, it is desirable that the velocity of cooling air flowing through the radiator core be as high as possible and be uniformly distributed over the entire available heat exchange surface of the radiator core. The heat exchange apparatus almost universally found in conventional motor vehicles propelled by liquid-cooled internal combustion engines involves a radiator or heat exchanger assembly which has a flat, generally rectangularly-shaped core structure. The radiator is usually oriented so as to be generally upright and is positioned axially forwardly of the engine. The heat exchange apparatus of conventional motor vehicles also includes, for the most part, a rotary fan of the axial flow, suction type which is positioned intermediate the engine and the flat radiator. The fan is designed to suck or draw air from the atmosphere forwardly of the radiator structure and cause the air stream induced thereby to flow substantially axially through the radiator. Heretofore, in most motor vehicle installations, the air stream after passing through the radiator core was discharged back over the engine which, as pointed out hereinbefore, is usually spaced axially rearwardly of the fan and radiator structure.

The rotary fan used in most motor vehicle engine heat exchange apparatuses for propelling the cooling air through the radiator core includes a multi-bladed rotor. The fan impeller blades extend radially from the fan hub and thus the fan blade tips circumscribe a circle when the fan is being operated.

Automotive cooling system engineers have long been intrigued with the possibility of overcoming the aforementioned operational shortcomings as well as other inherent and well known heat transfer deficiencies of traditional automotive heat exchange systems by using a toroidal type heat exchanger in lieu of the conventional flat radiator. In a toroidal heat exchanger, the radiator core is, in effect, wrapped around the fan and resembles a drum shell with the air stream intake and discharge faces of the radiator core in the form of radially spaced and parallel concentric cylinders. The fan, which is encircled by the radiator core, may be a blower type wherein cooling air is drawn axially from one axial side of the fan impeller blades and discharge radially outwardly through the radiator core or, alternatively, the fan may be a suction type wherein cooling air is drawn radially inwardly through the toroidal radiator core and discharged axially from one axial side of the heat exchange apparatus.

In the past various patents have issued relating to such heat exchange apparatus. For example, U.S. Pat. No. 4,306,614, issued on Dec. 22, 1981 to M. A. Maggiorana, describes a heat exchanger for marine propulsion engines. The heat exchanger includes a closed spiral passageway for the fresh cooling water drawn from the lake. An outer housing encloses the spiral passageway and includes baffle means for directing of a coolant in a spiral path over the cooling passageway within the housing. The coolant is thereby cooled by the circulating cold fresh water.

U.S. Pat. No. 4,895,203, issued on Jan. 23, 1990 to K. S. McLaren, describes a heat exchanger with a helically coiled conduit. The heat exchanger has a hollow cylinder having a cylindrical wall to define an annular space therebetween. A neatly fitting helical tubular coil with spaced helixes define a helical pathway between adjacent coil helixes. Working fluid passes through the tubular coil and process fluid passes through the helical pathway to effect heat exchange between the working and process fluids.

U.S. Pat. No. 4,690,210, issued on Sep. 1, 1987 to Niggemann et at., describes a fluid jet impingement heat exchanger. A mixed phase inlet stream is partially separated by centrifugal forces imparted to the stream by swirl inducers as the stream enters the inlet of the heat exchanger. Heat transfer efficiency is maximized by making the tube of rectangular cross section and providing liquid impingement jets active on three sides of the tube and by providing a baffle which forces the heat transfer fluid to further cool the tube by convection on the remaining side thereof.

U.S. Pat. No. 5,287,917, issued on Feb. 22, 1994 to A. Cannata, describes a heat exchanger having a core comprising a conduit, a plurality of heat conducting elements extending transversely through the conduit and having portions projecting outwardly on each side of the conduit, a plurality of fins spaced along the length of these portions, and a housing enclosing the conduits and heat conducting elements. A means is provided for directing a medium to be heated or cooled through the conduit. A means is also provided for inducing a flow of heat exchanging medium through the housing and over the heat conducting elements and fins.

U.S. Pat. No. 5,343,936, issued on Sep. 6, 1994 to Beatenbough et al., describes a spiral ripple circumferential flow heat exchanger that includes generally parallel plates connected to define a hollow passageway so that a generally circumferential flow of fluid between an inlet and an outlet is achieved. The plates are undulating in cross-section to define obliquely disposed crossing opposing valleys arranged in a spiral disposition.

U.S. Pat. No. 5,445,218, issued on Aug. 29, 1995 to S. Nieh, shows a compact heat exchanger having an annular body with a central cylindrical volume and having an inlet for one fluid at opposite ends. A plurality of peripherally-located first fluid inlets communicate with first fluid passages in the body. These passages curve arcuately outwardly to respective separate outlets on the exterior wall of the body. Another set of passages for another fluid extend axially from one end of the body to the opposite end between oppositely located plenum chambers.

U.S. Pat. No. 6,330,910, issued on Dec. 18, 2001 to E. Bennett, describes a heat exchanger for a motor vehicle exhaust. This heat exchanger has a tubular body with at least two flow passages that extend between the ends of the tubular body. The passages include at least one heat exchange fluid flow passage and at least one bypass fluid flow passage. A heat exchange coil is positioned in the at least one flow passage. The heat exchange coil has an inlet and an outlet that extend through the sidewalls of the tubular body.

U.S. Pat. No. 4,062,401, issued on Dec. 13, 1977 to Rudny et al., provides a toroidal multifluid segmented heat exchanger in which a plurality of segmented components are arranged to form a fixed radial heat exchanger. Each segment is an independent heat exchanger having a core of fluid tubes and air flow corridors between the tubes. Air flow is maintained through the heat exchanger by means of a propeller-type fan mounted coaxially with the heat exchanger.

U.S. Pat. No. 4,066,047, issued on Jan. 3, 19178 to Vidakovic et al., shows another type of toroidal heat exchanger that incorporates an air flow directing support cone housing a hydraulic motor used for driving an air propelling means at variable speeds depending on the cooling requirements of the host vehicle.

U.S. Pat. No. 4,136,735, issued on Jan. 30, 1979 to Beck et al., teaches a heat exchange apparatus including a toroidal-type radiator having radially extending cooling air passageways formed through the core thereof, a rotary fan positioned radially inwardly of the radiator core, and fan shroud means shaped and positioned with respect to the radiator core and the blades of the fan whereby the air stream induced by the fan during operation has a major component in a radial direction.

It is an object of the present invention to provide a heat exchanger which efficiently exchanges heat with air passing therethrough.

It is another object of the present invention to provide a heat exchange whereby a toroidal flow of a coolant will extend around an air flow conduit.

It is still another object of the present invention to provide heat exchanger whereby separate flows of air are provided through the heat exchanger for the purposes of cooling the coolant and for drawing air to the engine of a vehicle.

These and other objects and advantages of the present invention will become apparent from a reading of the attached specification and appended claims.

BRIEF SUMMARY OF THE INVENTION

The present invention is a heat exchange apparatus includes a housing having an air inflow opening and an air outflow opening, a first air forcing means cooperative with the housing for drawing air through the air inflow opening and for passing air outwardly of the air outflow opening, an air flow line extending within the housing, a second air forcing means connected to the air flow line for drawing air along the air flow line, and a coolant tube extending in a toroidal pattern around in the air flow line. The coolant tube is in heat exchange relationship with the air flow line.

In the present invention a conduit extends over and around the coolant tube and the air flow line. The second air forcing means serve to pass air in heat exchange relationship with the coolant tube interior of the conduit. A mesh material extends through the conduit. This mesh material is interposed between the conduit tube and an inner wall of the conduit. The air flow line is a tube positioned generally centrally of the conduit. The coolant tube wraps around the exterior surfaces of the coolant tube. Slots are formed on the air flow line so as to be in spaced relationship along a length of the air flow line. The second air forcing means serves to pass air along and through these slots.

In the present invention, the first air forcing means is a fan that is positioned exterior of the housing on an opposite side of the coolant tube from the air inflow opening.

The conduit of the present invention includes a first conduit extending across the air inflow opening of the housing and a second conduit extending across the air inflow opening of the housing in generally heat exchange relationship with the first conduit.

The second air forcing means will include a first fan positioned at one end of the first conduit and a second fan positioned at one end of the second conduit. Each of these fans is positioned forwardly of the air inflow opening.

The coolant tube has an outlet positioned outwardly of the housing. A coolant reservoir can be connected to the outlet of the coolant tube so as to provide a supply of a coolant to be passed through the housing. The air flow lines and the coolant tube extend across and are positioned adjacent to the air inflow opening.

The heat exchange apparatus of the present invention can be particularly utilized within a vehicle. This vehicle is of a type having an engine. The engine is drivingly connected to a fan. The first air forcing means is the fan of the vehicle. The fan of the vehicle serves to pass air across the housing toward the engine.

DETAILED DESCRIPTION OF THE INVENTION

Figure 1:
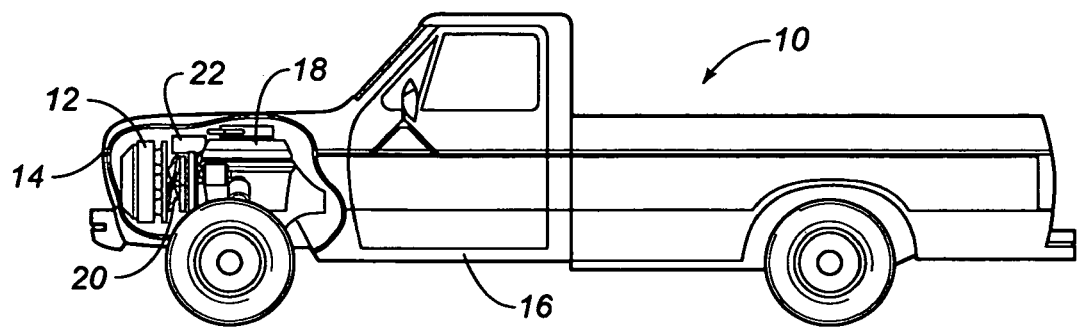
FIG. 1 is a diagrammatic illustration of the heat exchange apparatus as applied within a vehicle.

Referring to FIG. 1, there is shown a vehicle 10 in which the heat exchange apparatus 12 is employed. As can be seen, the heat exchange apparatus 12 is in the nature of a radiator positioned forwardly in the vehicle adjacent to the front 14 of the body 16 of the vehicle 10. The engine 18 is positioned rearwardly of the heat exchange apparatus 12. Engine 18 is driving connected to a fan placed in proximity adjacent to the air outflow opening of the heat exchange apparatus 12. A coolant reservoir 22 is positioned within the engine compartment of the vehicle 10. The heat exchange apparatus will be in communication with the coolant reservoir 22 so that the coolant can be drawn into the heat exchange apparatus 12, as required. In normal use, as the vehicle 10 is being driven forwardly, air will be forced through the front 14 of the vehicle 10, through the heat exchange apparatus 12 and onto the engine 18 so as to maintain the engine 18 in a relatively cooled condition. This prevents the engine from being overheated.

FIG. 1 illustrates the heat exchange apparatus 12 as used in the vehicle. The heat exchange apparatus 12 has a housing 24 in a generally rectangular configuration. The housing 24 will include a shroud 26 located at a rear side thereof. The shroud 26 will include the air outflow opening on the backside thereof. The air inflow opening 28 is positioned on the forward side of the housing 24.

In the present invention, it can be seen that the housing 24 has a plurality of conduits 30, 32, 34, 36 and 38 positioned therein. Each of the conduits 30, 32, 34, 36 and 38 extend in a generally horizontal orientation adjacent to the inflow opening 30 of the housing 24. In particular, each of the conduits 30, 32, 34, 36 and 38 is positioned generally in heat-exchange relationship with air that might be passing the air inflow opening 28. Additionally, the conduits are also generally placed in heat exchange relationship to each other. An air forcing means is associated with each of the conduits 30, 32, 34, 36 and 38. These air forcing means, as will be described hereinafter, are in the nature of separate fans which draw air through the respective screens 40 and 42. The air forcing means, along with the screens 40 and 42, are positioned forwardly of the air inflow opening 28. The air forcing means associated with each of the conduits 30, 32, 34, 36 and 38 serves to draw air directly into the respective conduits for the purposes of establishing heat exchange relationship interior of the conduits. The flow of air through the respective conduits 30, 32, 34, 36 and 38 serves to provide a cooling action to any fluids passing through the conduits.

Figure 2:
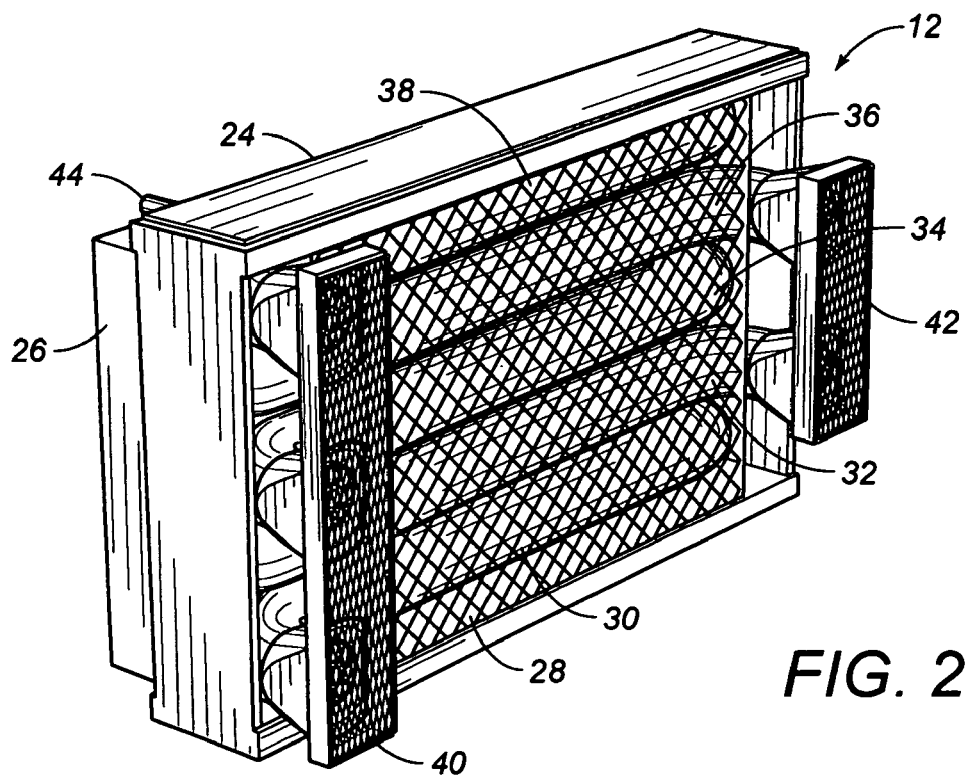
FIG. 2 is a perspective view of the heat exchange apparatus in accordance with preferred embodiment of the present invention.

As can be seen in FIG. 2, there is an outlet tube 44 extending from the rear of housing 24 outwardly therefrom so as to connect with the coolant reservoir 22. The outlet tube 44 can also deliver the cooled coolant back to the engine 18 in any manner, as desired.

Figure 3:
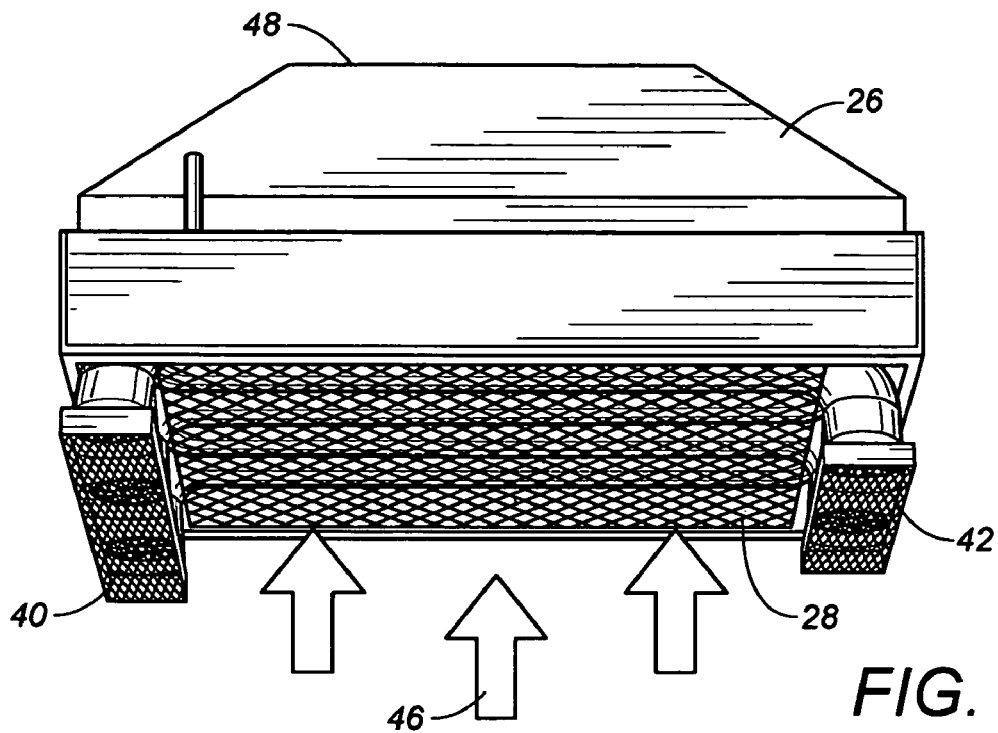
FIG. 3 is an upper perspective view of the heat exchange apparatus of the present invention.

FIG. 3 illustrates the manner in which air is delivered through the air inflow opening. The passage of air is illustrated by arrows 46. In normal use, when the vehicle 10 is moving forwardly, the air 46 will be delivered in the manner shown. Still further, the fan 20 associated with engine 18 will rotate so as to draw air through the air inflow opening 28 in the manner illustrated in FIG. 3. The action of the air 46 passing through the air inflow opening 28 will create a heat exchange relationship with the respective conduits 30, 32, 34, 36 and 38. Ultimately, the air 46 will pass outwardly of the shroud 26 through the air outflow opening 48.

It can be seen that the screens 40 and 42 will cover each of the air forcing means positioned therein. In particular, screens 40 and 42 will cover the ends of the inlets of the respective conduits 30, 32, 34, 36 and 38. Fans (as will be described in association with FIG. 7) are positioned at each of these inlets of the respective conduit so as to draw air through the screens 40 and 42 and through the respective conduits. The fans associated with the air forcing means of the present invention are positioned forwardly of the air inflow opening 28.

Figure 4:
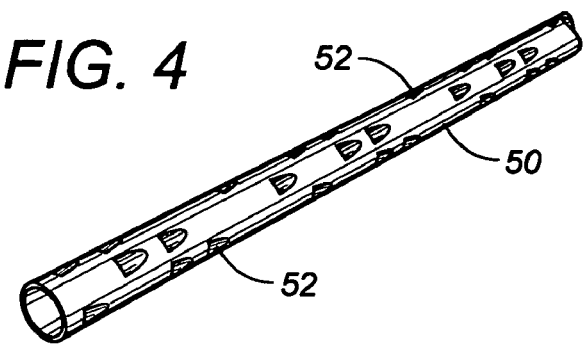
FIG. 4 is an isolated view of an air flow line as used in the heat exchange apparatus of the present invention.

The construction of the respective conduits 30, 32, 34, 36 and 38 will be described hereinafter in association with the description of FIGS. 4-7. FIG. 4 herein illustrates an isolated air flow line 50. The air flow line 50 will extend centrally of the respective conduits 30, 32, 34, 36 and 38. The air flow line 50 has a plurality of slots 52 arranged on and through the tube 50. As such, air is free to flow along the exterior of the air flow line 50, through the interior of the air flow line 50, and in a variable pattern through the respective slots 52. As such, the arrangement of slots 52 will enhance the ability for air to mix and be delivered in heat exchange relationship with the respective coolants tubes.

Figure 5:
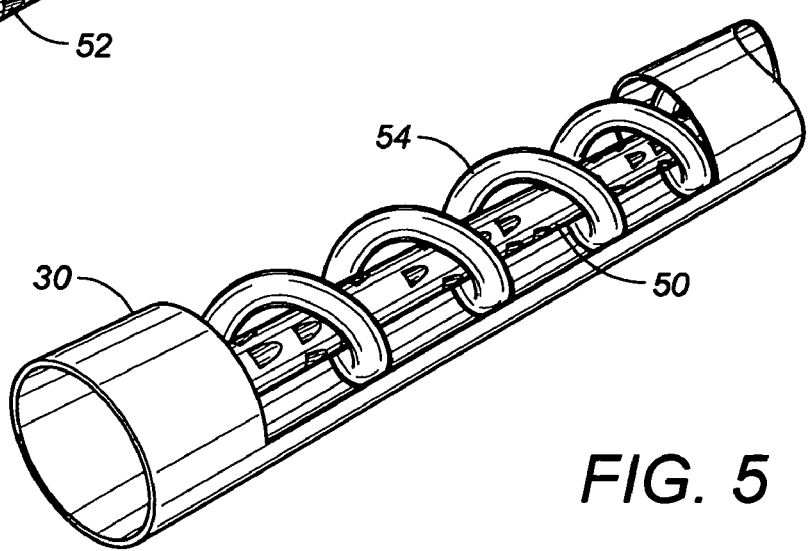
FIG. 5 is a partially broken-away view of the arrangement of the coolant tube within the conduit and around the air flow line of the heat exchange apparatus of the present invention.

In FIG. 5, it can be seen that each of the coolant tubes 54 has a generally helical pattern extending around the air flow line 50. The coolant tube 54 is generally of a coil shape that extends in slightly spaced relationship to the outer wall of the air flow line 50. The outermost surfaces of the coolant line 50 will be placed in proximity to the inner wall of the conduit 30. In normal use, air that is forced through the interior of the conduit 50 will pass in proximity to the exterior surfaces of the coolant tube 54 and be forced around the inner surfaces of the helical-shaped coolant tube 54. As a result, the forcing of air across both the exterior surfaces and the interior surfaces of the coolant tube 54 will enhance the heat exchange efficiency of the heat exchange apparatus of the present invention. The turbulent flow of air through the air flow line 50 further enhances the mixing of the cool and hot air with the coolant in the coolant line 54. As a result, the high temperature coolant within the coolant line 54 can be effectively cooled by the efficient interaction of air through the interior of the conduit 50.

Figure 6:
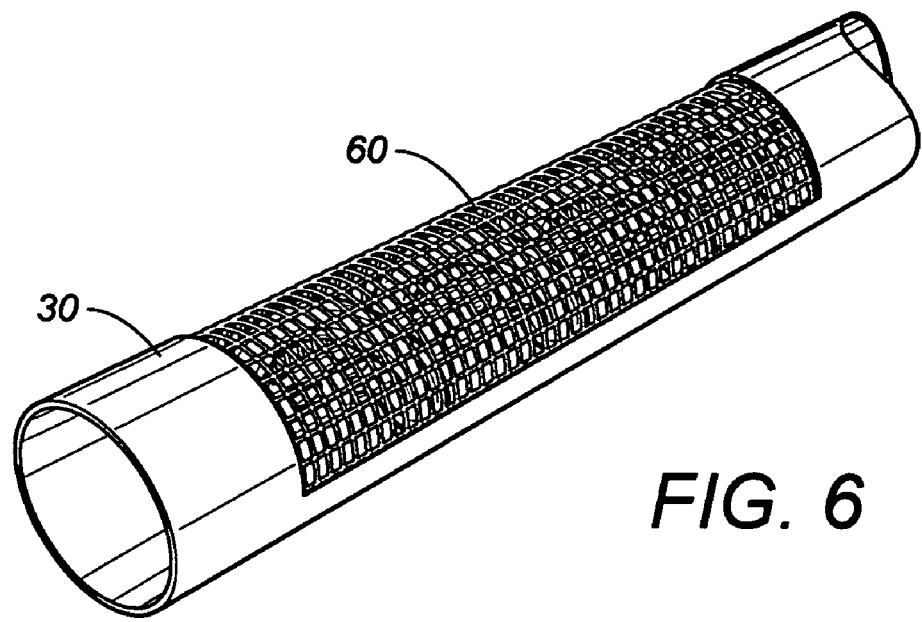
FIG. 6 is a perspective partially broken-away view of the conduit as used in the heat exchange apparatus of the present invention.

FIG. 6 illustrates that a mesh material 60 will be interposed between the outermost surface of the coolant tube 54 and the inner wall of the conduit 30. The mesh 60 further enhances the turbulent action of air passing through the conduit 50 and assures an intimate contact between the surfaces of the coolant tube 50 and the air passing through the conduit 30. The mesh 60 also enhances the structure of the conduit 30.

Figure 7:
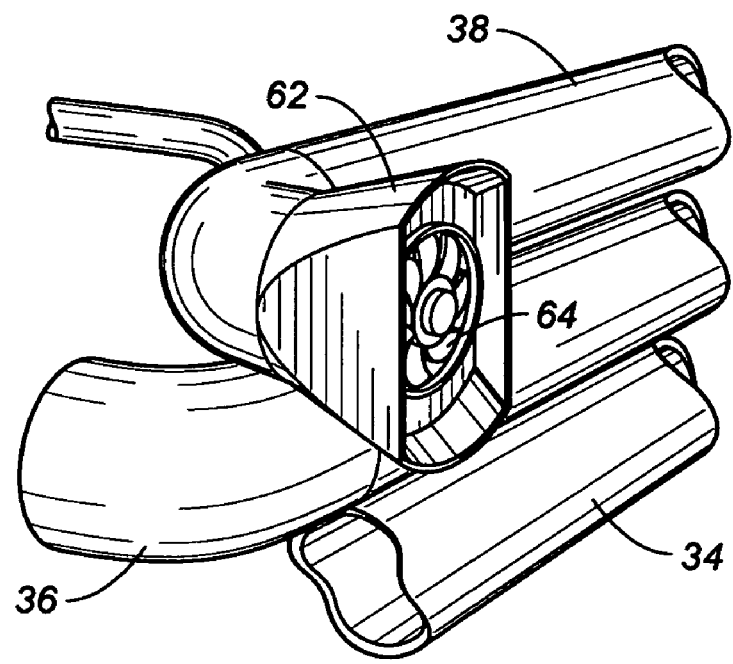
FIG. 7 is a perspective isolated view showing the forced air fan connected to the conduit of the heat exchange apparatus of the present invention.

FIG. 7 illustrates that there is a shroud 62 positioned at the end of the conduit 38. Shroud 62 will house a fan 64 therein. Each of the conduits 30, 32, 34, 36 and 38 will such a fan 64 placed thereinto. When the fan 64 is operated, it will draw air in a forced manner into the shroud 62. The decreasing diameter of the shroud 62 will create a venturi effect so as to enhance the velocity of the air passing through the interior of the conduit 38. The air passing through conduit 36 will be in an opposite direction to that of the air passing through conduit 38. Similarly, the air passing through conduit 34 will be in an opposite direction to the air passing through conduit 36.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A heat exchange apparatus comprising:
a housing having an air inflow opening and an air outflow opening;
a first air forcing means cooperative with said housing for drawing air through said air inflow opening and for passing air outwardly of said outflow opening;
an air flow line extending within said housing;
a second air forcing means connected to said air flow line for drawing air along said air flow line;
a coolant tube extending in a helical pattern around in said air flow line, said coolant tube being in heat exchange relation to said air flow line; and
a conduit extending over and around said coolant tube and said air flow line, said second air forcing means for passing air in heat exchange relationship with said coolant tube interior of said conduit.

2. The apparatus of claim 1, further comprising:
a mesh material extending through said conduit, said mesh material being interposed between said coolant tube and an inner wall of said conduit.

3. The apparatus of claim 1, said air flow line being a tube positioned generally centrally of said conduit, said coolant tube being wrapped around an exterior of said air flow line.

4. The apparatus of claim 1, said air flow line being a tube having slots formed therein, said slots extending along said tube in spaced relationship to each other along a length of said tube, said second air forcing means for passing air along and through said slots.

5. The apparatus of claim 1, said first air forcing means comprising:
a fan positioned exterior of said housing on an opposite side of said coolant tubes from said air inflow opening.

6. The apparatus of claim 1, said conduit comprising:
a first conduit extending across said inflow opening of said housing; and
a second conduit extending across said inflow opening of said housing in generally heat exchange relationship with said first conduit.

7. The apparatus of claim 6, said second air forcing means comprising:
a first fan positioned at one end of said first conduit; and
a second fan positioned at one end of said second conduit.

8. The apparatus of claim 7, each of said first and second fans positioned forwardly of said air inflow opening.

9. The apparatus of claim 1, said coolant tube having an outlet positioned outwardly of said housing, the apparatus further comprising:
a coolant reservoir connected to said outlet of said coolant tube.

10. The apparatus of claim 1, said air flow line and said coolant tube extending across and positioned adjacent said air inflow opening.

11. The apparatus of claim 1, further comprising:
a vehicle having an engine, said housing positioned forwardly of said engine, said first air forcing means being a fan drivingly connected to said engine for passing air from said housing toward said engine.

12. An apparatus comprising:
a vehicle having a body with an engine therein, said engine drivingly connected to a fan means;
a housing positioned forwardly of said engine within said body, said housing having an air inflow opening and an air outflow opening, said fan means cooperative with said housing for drawing air through said air inflow opening and outwardly of said air outflow opening;
a first conduit extending across said air inflow opening, said first conduit having an interior passageway;
a coolant tube extending in a helical pattern within said interior passageway; and
an air flow forcing means cooperative with said first conduit for passing air through said conduit and over said coolant tube.

13. The apparatus of claim 12, further comprising:
an air flow line positioned within and extending along said first conduit, said air flow line being in heat exchange relationship with said coolant tube.

14. The apparatus of claim 13, said air flow line being slotted therealong.

15. The apparatus of claim 12, further comprising:
a second conduit extending across said air inflow opening, said second conduit being in heat exchange relationship to said first conduit, said air flow forcing means cooperative with said second conduit for passing air through said second conduit.

16. A heat exchange apparatus for use in a radiator comprising:
a conduit having an interior passageway, said conduit having an intake and an exhaust;
an air flow line extending through said interior passageway of said conduit;
a coolant tube extending in a helical pattern over and around said air flow line and within said conduit;
a coolant passing means connected to said coolant tube for delivering a coolant through said coolant tube; and
an air forcing means connected to said intake of said conduit, said air forcing means for passing through said air flow line and through said conduit in heat exchange relationship with said coolant tube, said air flow line having a plurality slots in spaced relationship extending along a length of air flow line.

17. The apparatus of claim 16, further comprising:
a mesh extending along and positioned in said interior passageway of said conduit, said mesh being interposed between an outermost surface of said coolant tube and an inner wall of said conduit.

18. The apparatus of claim 16, said air forcing means comprising:
a fan positioned at said intake of said conduit.

* * * * *